US012636582B2

(12) United States Patent
Han et al.

(10) Patent No.: US 12,636,582 B2
(45) Date of Patent: May 26, 2026

---

(54) GAME CHARACTER CONTROL METHOD AND APPARATUS, STORAGE MEDIUM AND ELECTRONIC DEVICE

(71) Applicant: BEIJING ZITIAO NETWORK TECHNOLOGY CO., LTD., Beijing (CN)

(72) Inventors: Guoan Han, Beijing (CN); Xueying Du, Beijing (CN); Chi Li, Beijing (CN); Yutong Yang, Beijing (CN); Jiaqi Shi, Beijing (CN); Bei Shi, Beijing (CN); Hongliang Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 286 days.

(21) Appl. No.: 18/466,577

(22) Filed: Sep. 13, 2023

(65) Prior Publication Data
US 2024/0123348 A1 Apr. 18, 2024

(30) Foreign Application Priority Data

Oct. 13, 2022 (CN) .......................... 202211256120.9

(51) Int. Cl.
*A63F 13/56* (2014.01)
*A63F 13/5372* (2014.01)
*A63F 13/67* (2014.01)

(52) U.S. Cl.
CPC .......... *A63F 13/56* (2014.09); *A63F 13/5372* (2014.09); *A63F 13/67* (2014.09); *A63F 2300/5533* (2013.01); *A63F 2300/64* (2013.01)

(58) Field of Classification Search
CPC ...... A63F 13/5372; A63F 13/56; A63F 13/67; A63F 2300/5533; A63F 2300/64
See application file for complete search history.

(56) References Cited

U.S. PATENT DOCUMENTS 9,672,190 B1 * 6/2017 Yu .......................... H04L 67/306
9,997,016 B2 * 6/2018 Arnone .............. G07F 17/3262
(Continued)

FOREIGN PATENT DOCUMENTS

CN 111589157 A 8/2020
CN 111632379 A 9/2020
(Continued)

OTHER PUBLICATIONS

First Office Action for Chinese Application No. 202211256120.9, mailed Apr. 17, 2025, 24 pages.
(Continued)

*Primary Examiner* — William H Mcculloch, Jr.
(74) *Attorney, Agent, or Firm* — Astute IP Law Group

(57) ABSTRACT

The present disclosure relates to the technical field of computers, and in particular to a game character control method and apparatus, a storage medium and an electronic device. In the method, game state information of a game match is adjusted according to game alignments to which an intelligent agent and a player character belong, so as to obtain target state information, a target game intention of the intelligent agent is determined according to the target state information, then a target operation of the intelligent agent in the game match is determined according to the target state information and the target game intention, and the target operation executed by the intelligent agent may be adjusted according to different game situations, so that the intelligent agent can flexibly adjust game actions to provide different playing methods in a human-computer battle.

20 Claims, 8 Drawing Sheets

(56) References Cited

U.S. PATENT DOCUMENTS

| | | | | |
|---|---|---|---|---|
| 10,384,127 | B1 * | 8/2019 | Yu | A63F 13/5375 |
| 10,885,739 | B2 * | 1/2021 | Arnone | G07F 17/3262 |
| 11,673,052 | B2 * | 6/2023 | Uehara | A63F 13/537 |
| | | | | 463/42 |
| 11,706,499 | B2 * | 7/2023 | Bennett | A63F 13/215 |
| | | | | 706/25 |
| 12,182,923 | B1 * | 12/2024 | Tomsett | G06T 13/40 |
| 2008/0097948 | A1 * | 4/2008 | Funge | A63F 13/67 |
| | | | | 706/47 |
| 2015/0165310 | A1 * | 6/2015 | Rebh | A63F 13/47 |
| | | | | 463/29 |
| 2016/0055711 | A1 * | 2/2016 | Arnone | G07F 17/3262 |
| | | | | 463/9 |
| 2020/0134447 | A1 * | 4/2020 | Bennett | A63F 13/54 |
| 2023/0047787 | A1 * | 2/2023 | Chappell, III | A61B 5/486 |
| 2023/0186110 | A1 * | 6/2023 | Xie | G06N 3/006 |
| | | | | 706/46 |
| 2023/0256341 | A1 * | 8/2023 | Cai | G06T 19/20 |
| 2024/0123344 | A1 * | 4/2024 | Yang | G06N 3/006 |
| 2024/0123347 | A1 * | 4/2024 | Du | A63F 13/822 |
| 2024/0123348 | A1 * | 4/2024 | Han | A63F 13/5372 |
| 2025/0010207 | A1 * | 1/2025 | Yao | A63F 13/67 |
| 2025/0258685 | A1 * | 8/2025 | Crabtree | A63F 13/40 |

FOREIGN PATENT DOCUMENTS

| | | |
|---|---|---|
| CN | 113577769 A | 11/2021 |
| CN | 113996063 A | 2/2022 |
| CN | 114344889 A | 4/2022 |
| KR | 20150021380 A | 3/2015 |

OTHER PUBLICATIONS

Wenjie L, [New game failure] Bloody Revenge VS Left 4 Dead 2 (AI teammate boss battle performance) Can Bloody Revenge surpass Left 4 Dead 2 and be called Left 4 Dead 3?—Bilibili, https://b23.tv/GqfCs1M , 2021, 6 pages.

* cited by examiner

101

Game state
information

Target
operation

102

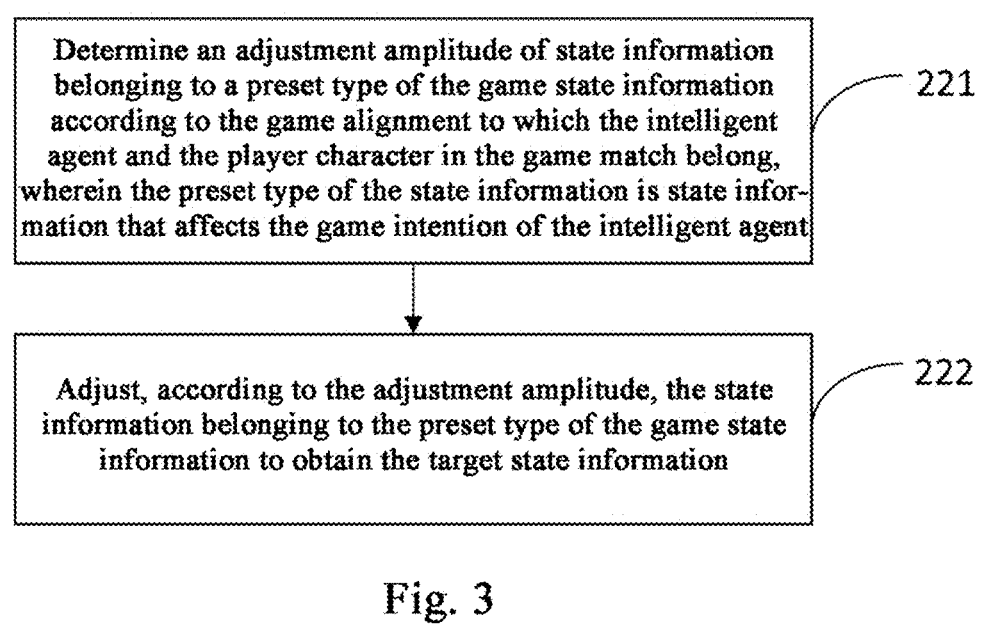

Determine an adjustment amplitude of state information belonging to a preset type of the game state information according to the game alignment to which the intelligent agent and the player character in the game match belong, wherein the preset type of the state information is state information that affects the game intention of the intelligent agent — 221

Adjust, according to the adjustment amplitude, the state information belonging to the preset type of the game state information to obtain the target state information — 222

Fig. 3

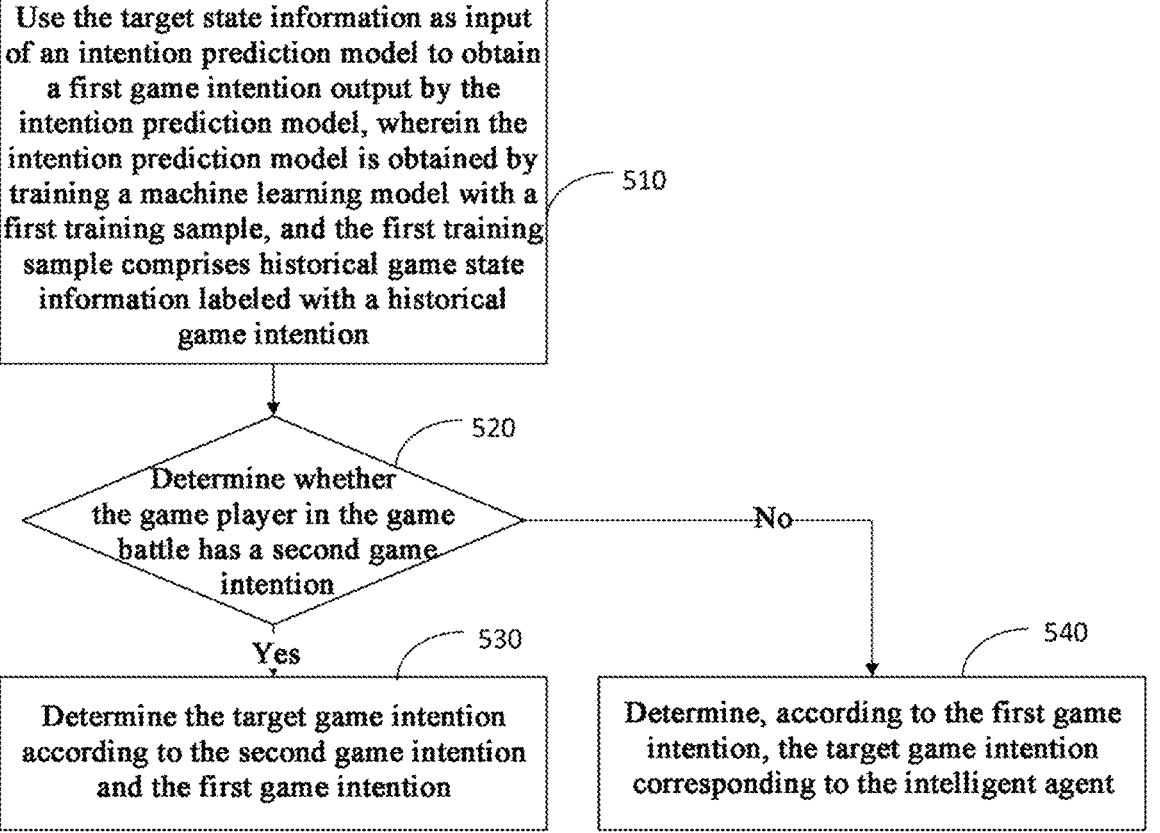

Use the target state information as input of an intention prediction model to obtain a first game intention output by the intention prediction model, wherein the intention prediction model is obtained by training a machine learning model with a first training sample, and the first training sample comprises historical game state information labeled with a historical game intention

510

Determine whether the game player in the game battle has a second game intention

520

No

Yes

530

Determine the target game intention according to the second game intention and the first game intention

540

Determine, according to the first game intention, the target game intention corresponding to the intelligent agent

701 — Acquisition module

702 — Parameter adjustment module

703 — Intention determination module

704 — Operation determination module

705 — Control module

800

GAME CHARACTER CONTROL METHOD AND APPARATUS, STORAGE MEDIUM AND ELECTRONIC DEVICE

CROSS REFERENCE TO RELATED APPLICATIONS

This application claims priority to CN. Application Ser. No. 202211256120.9, filed Oct. 13, 2022, and titled "GAME CHARACTER CONTROL METHOD AND APPARATUS, STORAGE MEDIUM AND ELECTRONIC DEVICE", the disclosure of which is incorporated herein by reference in its entirety.

FIELD

The present disclosure relates to the technical field of computers, and in particular to a game character control method and apparatus, a storage medium and an electronic device.

BACKGROUND

In the electronic game industry, the application of artificial intelligence (AI) to games has become a development trend. With the iteration of the game AI technology, game AI may serve as both a competitor of human players and a game partner to fight shoulder to shoulder with the human players in electronic games, which is of great significance for improving the game experience and the activity of the players. However, most existing game AI makes independent decisions in game matches, for example, performing a character and executing a specified action by means of a decision tree. As a result, the game AI cannot cooperate well with the players, making it difficult to provide the players with a better game experience.

SUMMARY

The Summary portion is provided to introduce concepts in a brief form, and these concepts will be described in detail in the following Detailed Description. The Summary portion is not intended to identify key features or essential features of the claimed subject matters, nor is it intended to be used to limit the scope of the claimed subject matters.

In a first aspect, the present disclosure provides a game character control method, including:

acquiring game state information of a game match;

adjusting the game state information to obtain target state information adapted to the intelligent agent according to game alignments to which an intelligent agent and a player character in the game battle belong;

determining, based on the target state information, a target game intention corresponding to the intelligent agent, wherein the target game intention characterizes a battle target of the intelligent agent;

determining a target operation corresponding to the intelligent agent according to the target game intention and the target state information; and controlling the intelligent agent to execute the target operation.

In a second aspect, the present disclosure provides a game character control apparatus, including:

an acquisition module configured to acquire game state information of a game match;

a parameter adjustment module configured to adjust the game state information to obtain target state information adapted to the intelligent agent according to game alignments to which an intelligent agent and a player character in the game battle belong;

an intention determination module configured to determine, based on the target state information, a target game intention corresponding to the intelligent agent, wherein the target game intention characterizes a battle target of the intelligent agent;

an operation determination module configured to determine a target operation corresponding to the intelligent agent according to the target game intention and the target state information; and a control module configured to control the intelligent agent to execute the target operation.

In a third aspect, the present disclosure provides a computer-readable storage medium, on which a computer program is stored, wherein when executed by a processing apparatus, the program implements the steps of the method in the first aspect.

In a fourth aspect, the present disclosure provides an electronic device, including:

a storage apparatus, on which a computer program is stored; and a processing apparatus, used for executing the computer program in the storage apparatus, so as to implement the steps of the method in the first aspect.

Based on the above technical solutions, the target game intention of the intelligent agent may be dynamically adjusted by adjusting the game state information of the game match according to the game alignments to which the intelligent agent and the player character belong, then the target operation of the intelligent agent in the game match is determined according to the target game state information and the target game intention, and the target operation executed by the intelligent agent may be adjusted according to different game situations, so that the intelligent agent can flexibly adjust game actions to provide different playing methods in a human-computer battle. For example, by adjusting the game state information, the intelligent agent of an own alignment may actively respond to the requirements of the player character, and cooperate with the player character to realize the battle target. As another example, by adjusting the game state information, the confrontation strength between the intelligent agent of an opponent alignment and the player character may be reduced, so that a real player can obtain better game experience in the game match.

Other features and advantages of the present disclosure will be described in detail in the following Detailed Description.

BRIEF DESCRIPTION OF THE DRAWINGS

The above and other features, advantages and aspects of various embodiments of the present disclosure will become more apparent in combination with the drawings and with reference to the following Detailed Description. Throughout the drawings, the same or similar reference numbers refer to the same or similar elements. It should be understood that the drawings are schematic, and members and elements are not necessarily drawn to scale. In the drawings:

FIG. 3 is a detailed flowchart of a step 220 shown in FIG. 2.

FIG. 5 is a flowchart of determining a target game intention illustrated according to an exemplary embodiment.

DETAILED DESCRIPTION OF EMBODIMENTS

Figure 1:
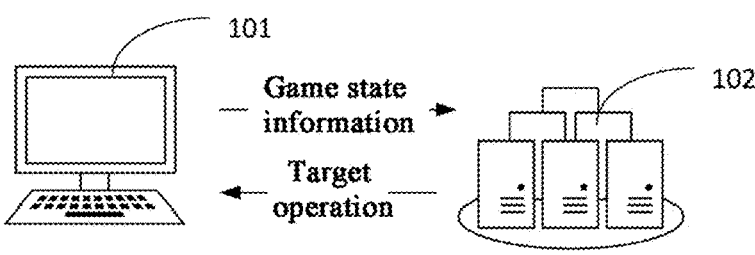
FIG. 1 is a schematic diagram illustrating a scenario of a game character control method according to an exemplary embodiment.

Embodiments of the present disclosure will be described in more detail below with reference to the drawings. Although some embodiments of the present disclosure are shown in the drawings, it should be understood that the present disclosure may be implemented in various forms and should not be construed as being limited to the embodiments set forth herein, but rather these embodiments are provided for a more thorough and complete understanding of the present disclosure. It should be understood that the drawings and the embodiments of the present disclosure are merely for illustrative purposes and are not intended to limit the protection scope of the present disclosure.

It should be understood that, various steps recorded in the method embodiments of the present disclosure may be executed in different orders, and/or executed in parallel. In addition, the method embodiments may include additional steps and/or omit the shown steps. The scope of the present disclosure is not limited in this regard.

The term "including" and variations thereof as used herein mean open-ended inclusions, that is, "including but not limited to". The term "based on" means "at least partially based on". The term "one embodiment" means "at least one embodiment"; the term "another embodiment" means "at least one additional embodiment"; and the term "some embodiments" means "at least some embodiments". Related definitions of other terms will be given in the following description.

It should be noted that, the concepts such as "first" and "second" mentioned in the present disclosure are only used to distinguish different apparatuses, modules or units, and are not used to limit the order or interdependency relationship of functions executed by these apparatuses, modules or units.

It should be noted that, the modification of "one" and "a plurality of" mentioned in the present disclosure is schematic and non-restrictive, and it should be understood by those skilled in the art that, unless the context clearly indicates, the modification should be understood as "one or more".

The names of messages or information exchanged among a plurality of apparatuses in the embodiments of the present disclosure are only used for illustrative purposes, and are not intended to limit the scope of these messages or information.

It can be understood that, before the technical solutions disclosed in the various embodiments of the present disclosure are used, the type, the usage range, the usage scenario and the like of personal information involved in the present disclosure should be informed to a user in an appropriate manner according to relevant laws and regulations, and the authorization of the user is obtained.

For example, when the user uses game AI in a game match, in response to receiving an active request of the user, prompt information is sent to the user to explicitly prompt the user that an operation which the user requests to execute needs to acquire and use the personal information of the user, such as information in the game match. Thus, the user may autonomously select, according to the prompt information, whether to provide the personal information for software or hardware which executes the operations in the technical solutions of the present disclosure, such as an electronic device, an application program, a server, or a storage medium. As an optional but non-restrictive implementation, in response to receiving the active request of the user, the manner of sending the prompt information to the user may be, for example, a pop-up window, and the prompt information may be presented in the pop-up window in a text manner. furthermore, the pop-up window may also carry a selection control for the user to select to "agree" or "disagree" to provide the personal information for the electronic device.

It can be understood that, the above process of notifying and acquiring the authorization of the user is only schematic and does not constitute a limitation on the implementations of the present disclosure, and other manners satisfying related laws and regulations may also be applied to the implementations of the present disclosure.

Meanwhile, it can be understood that, data (including but not limited to the data itself, the acquisition or use of the data) involved in the present technical solution should follow the requirements of corresponding laws and regulations, as well as related specifications.

Before the embodiments of the present disclosure are further described in detail, nouns and terms involved in the embodiments of the present disclosure are described, and the nouns and terms involved in the embodiments of the present disclosure are applicable to the following explanations.

1) A game character, which may also be referred to as a virtual object and may be referred to as a hero in some games, refers to a movable object in a game. The movable object may be at least one of a virtual character, a virtual animal and a cartoon character. Optionally, when the game environment is a three-dimensional game environment, the game character is a three-dimensional model, and each game character has its own shape and volume in the three-dimensional game environment, and occupies a part of space in the three-dimensional game environment. Optionally, the game character may be a hero character, a soldier or a neutral creature in a battle game, and in the embodiments of the present application, it is taken as an example for illustration that the game character is a hero character.

2) An intelligent agent, which may also be referred to as game AI, or may be referred to as a BOT (Robot), refers to a game character capable of interacting with the game environment in the game. For example, the intelligent agent may communicate, cooperate or battle with other intelligent agents in a certain specific game environment according to its own perception on the game environment and in accordance with existing indications or by means of autonomous learning, and autonomously complete a set target in the game environment where the intelligent agent is located. It should be understood that, the behaviors of the intelligent agent in the game are controlled by artificial intelligence suitable for the game, and various behaviors can be simulated on the basis of the requirements of the game.

The technical solutions of the present disclosure will be further described in detail below in combination with the drawings and specific embodiments.

FIG. 1 is a schematic diagram illustrating a scenario of a game character control method according to an exemplary embodiment. As shown in FIG. 1, the game character control method provided in the embodiment of the present disclosure is applicable to the application scenario shown in FIG. 1, and the application scenario may include a plurality of terminals 101 and servers 102, where the terminals 101 and the servers 102 may perform data interaction by means of a wired or wireless connection.

The servers 102 may be the servers 102 of a game platform, and the terminals 101 access the servers 102 by means of a game client, so as to play a game. For example, a game player may log in the game by means of the game client, and select a competitive mode, a competitive teammate, a competitive opponent, and the like to play the game. The competitive teammate and/or the competitive opponent may be an intelligent agent, that is, a game match running by means of the terminals 101 may be a human-computer battle mode, or a battle mode in which the intelligent agent participates.

Taking the human-computer battle mode as an example, in the human-computer battle mode, the terminals 101 may collect game state information of a game match, and send the collected game state information to the servers 102. The servers 102 may receive the game state information sent by the terminals 101, and adjust the game state information according to game alignments to which an intelligent agent and a player character in the game match belong, so as to obtain target state information adapted to the intelligent agent. Then, on the basis of the target state information, the servers 102 determine a target game intention corresponding to the intelligent agent, and determines a target operation corresponding to the intelligent agent according to the target game intention and the target state information. Next, the servers 102 send the target operation to the terminals 101, so that the terminals 101 controls the intelligent agent to execute the target operation. The player character in the embodiment of the present disclosure refers to a virtual character which is manipulated by a real player.

Of course, in an actual application process, the terminals 101 may also independently execute the game character control method provided in the embodiment of the present disclosure.

Figure 2:
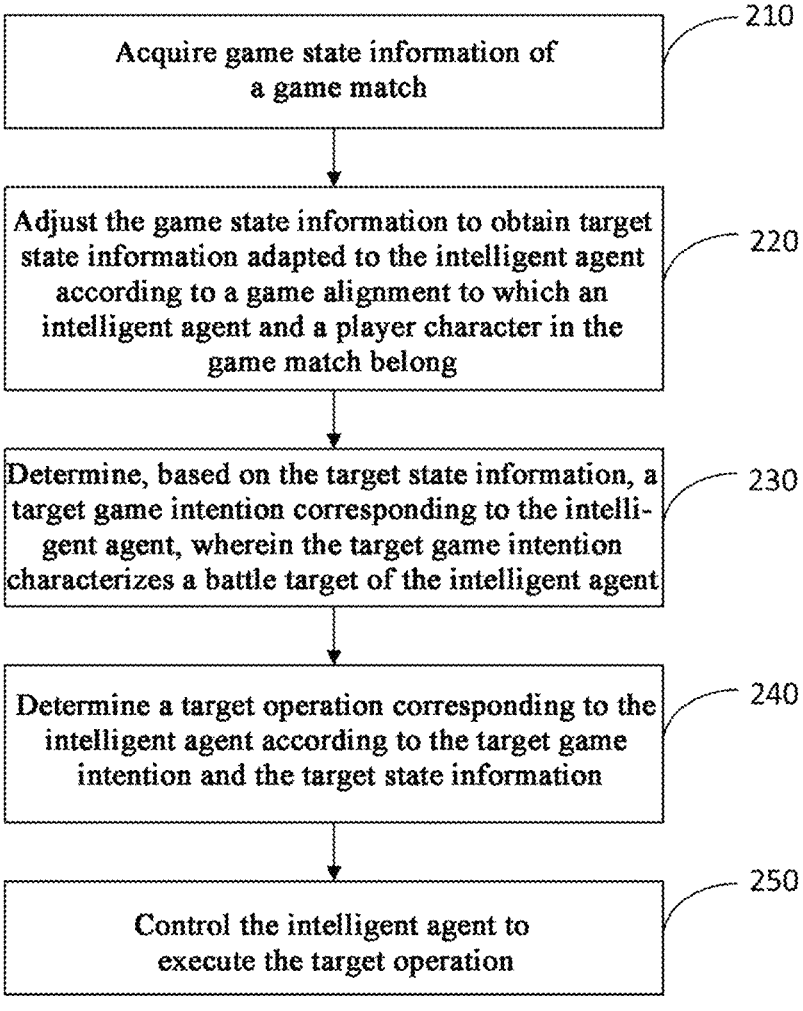
FIG. 2 is a flowchart illustrating a game character control method according to an exemplary embodiment.

FIG. 2 is a flowchart illustrating a game character control method according to an exemplary embodiment. The method may be executed by the servers 102 or the terminals 101 in FIG. 1. As shown in FIG. 2, the game character control method may include the following steps:

In step 210, game state information of a game match is acquired.

Here, the game match may be a match of a battle game, and the game match may be a match composed of a real player and an intelligent agent, where the intelligent agent may serve as a teammate or an opponent of the real player in the game match. Of course, the game match may be a match which is completely composed of real players at the beginning, but in the process of the game match, since one or more real players exit, the intelligent agents replace the real players to control the game characters.

The game state information of the game match includes at least one of character state data of the game character of the game match, a game environment where the game character is located, and communication information of the game character. The character state data of the game character may be a game alignment to which the game character belongs, such as an own alignment of the player character, and an opponent alignment of the player character. The character state data of the game character may include data such as a health point (Health Point, HP) of the game character, a mana point (MANA POINT, MP) of the game character, a skill state, an economic state, equipment, etc. It should be understood that, the game character in the embodiment of the present disclosure may not only include a game character manipulated by a real player, that is, a player character, and may also include a game character manipulated by game AI, that is, an intelligent agent. The game environment where the game character is located refers to the terrain and position in a game map where the game character is located, the distance between the game characters, and the like. The communication information of the game character refers to a signal sent by the game character in the game match, such as an attack signal, a withdrawal signal, and the like. The type of the signal may be varied, for example, a signal triggered in the form of a mark in the game match, a voice signal, a text signal, etc.

It is worth noting that, the game state information of the game match refers to feature information for reflecting the game situation of the game match. The game state information changes with time in the game match, the game state information corresponding to the current timing may be referred to as the current game state information, and generally, the game state information at the current timing is acquired, so as to control the intelligent agent according to the current game situation.

Exemplarily, the game state information may be acquired from a game engine, where the game engine refers to core components of some written editable computer gaming systems or some interactive real-time image application programs. Of course, the game state information may also be obtained by performing image recognition on a game picture of the current frame.

In step 220, according to the game alignments to which the intelligent agent and the player character in the game match belong, the game state information is adjusted to obtain target state information adapted to the intelligent agent.

Here, the game alignments include an own alignment and an opponent alignment, and when the intelligent agent and the player character in the game match belong to the same game alignment, it indicates that the intelligent agent belongs to the own alignment of the player character, and at this time, the intelligent agent is equivalent to an accompanying robot. When the intelligent agent and the player character in the game match do not belong to the same game alignment, it indicates that the intelligent agent belongs to the opponent alignment of the player character.

Adjusting the game state information according to the game alignments to which the intelligent agent and the player character belong refers to modifying the game state information corresponding to each intelligent agent to obtain the target state information. For example, HP ratios of the intelligent agent to other game characters in the game state information are modified, or economic differences between the intelligent agent and the other game characters in the game state information are modified.

It should be understood that, in the game match, there may be a plurality of intelligent agents, and according to different game alignments to which the intelligent agent and the player character belong, the adjustment of the game state information corresponding to each intelligent agent may also be different. For example, in a game match, there are one player character and nine intelligent agents, where four intelligent agents serve as teammates of the player character and thus belong to the own alignment, and five intelligent agents serve as opponents of the player character and thus belong to the opponent alignment. For the four intelligent agents belonging to the own alignment, an adjustment strategy of the game state information may be different from the adjustment strategy of the five intelligent agents belonging to the opponent alignment, so that the intelligent agents belonging to the own alignment and the intelligent agents belonging to the opponent alignment realize different game strategies.

In step 230, on the basis of the target state information, a target game intention corresponding to the intelligent agent is determined, where the target game intention characterizes a battle target of the intelligent agent.

Here, the target game intention refers to the battle target of the intelligent agent within a future period of time, and the battle target may refer to a map area, a strategic point, or a map resource to be defended/attacked by the intelligent agent. For example, the battle target of the intelligent agent may be to help the player character to gank, help the player character to clean minions, attack an enemy defense tower, clean wild monsters, attack a specific monster in the game (e.g., BOSS monsters such as a large dragon and a small dragon), acquire the field of view of a dark area of the game map, eliminate a visual guard in the game map, and cooperate with the player character to execute a certain game strategy, etc.

Exemplarily, the game state information may be input into an intention prediction model, so as to obtain the target game intention, where the intention prediction model may include an input layer, a hidden layer and an output layer, and a neural network model outputs the target game intention on the basis of a strategy function and according to the input game state information. By adjusting the parameters of the hidden layer, the output target game intention can be adjusted.

It is worth noting that, by adjusting the game state information, and in fact, adjusting the game intention of the intelligent agent, the game intention of the intelligent agent is dynamically modified according to the game situation of the game match. For different intelligent agents in the game match, since the adjustment strategies for adjusting the game state information are different, the corresponding target state information is different, and then the corresponding target game intentions are also different.

For example, for the intelligent agent belonging to the opponent alignment, the HP ratio, the economic ratio and the like of the player character relative to the intelligent agent may be improved, so as to reduce the attack desire of the intelligent agent of the opponent alignment on the player character, or, the HP ratio, the economic ratio and the like of the intelligent agent belonging to the own alignment relative to the intelligent agent belonging to the opponent alignment are reduced, so as to improve the attack desire of the intelligent agent of the opponent alignment on the intelligent agent of the own alignment.

As another example, for the intelligent agent of the own alignment, the game intention of the intelligent agent may be modified by adjusting the game state information, so that the intelligent agent can cooperate with the player character to realize the battle target to be realized by the player character, for example, cooperate with the player character to clean the minions, and the like.

As another example, for the intelligent agent of the opponent alignment, the game intention of the intelligent agent may be modified by adjusting the game state information, so that the intelligent agent loses the intention of contending for a target strategic resource. For example, when the player character is attacking a resource point, the game state information of the intelligent agent of the opponent alignment is modified, so that the intelligent agent of the opponent alignment does not compete with the player character for the resource point.

In step 240, according to the target game intention and the target state information, a target operation corresponding to the intelligent agent is determined.

Here, the target operation may include a micro-operation and/or a macro-operation, where the micro-operation refers to specific operations such as the movement of the intelligent agent, skill release, a selected attack target, and the like. The macro-operation refers to strategic cooperation of the intelligent agent with the player character in the game match. For example, when the player character is about to attack a small dragon resource point on a bottom lane, the target operation may be that the intelligent agent located on a top lane approaches to the small dragon resource point in advance, so as to cooperate with the player to attack the small dragon resource point.

Exemplarily, the target game intention and the target state information may be used as the input of an action prediction model, so as to obtain the target operation output by the action prediction model. The action prediction model may be obtained by training a machine learning model with a sample game intention that is labeled with a preset operation, and sample state information. The machine learning model may include a neural network model, where the neural network model may include an input layer, a hidden layer and an output layer, and the neural network model outputs, based on a strategy function, the target operation according to the input target state information and the target game intention. By adjusting the parameters of the hidden layer, the output target operation can be adjusted.

In step 250, the intelligent agent is controlled to execute the target operation.

Here, the target operation may include a game action that needs to be executed and a time point at which the game action is executed. When the target operation is to release a skill B at a time point A, the intelligent agent is controlled to release the skill B at the time point A. When the target operation is to start to move to a target point D at a time point C by means of a preset path, the intelligent agent is controlled to start to move to the target point D at the time point C along the preset path.

Therefore, the target game intention of the intelligent agent may be dynamically adjusted by adjusting the game state information of the game match according to the game alignments to which the intelligent agent and the player character belong, then the target operation of the intelligent agent in the game match is determined according to the target game state information and the target game intention. The target operation executed by the intelligent agent can be adjusted according to different game situations, so that the intelligent agent can flexibly adjust game actions to provide different playing methods in a human-computer match. For example, by adjusting the game state information, the intelligent agent of the own alignment may actively respond to the requirements of the player character, and cooperate with the player character to realize the battle target. As another example, by adjusting the game state information, the confrontation strength between the intelligent agent of the opponent alignment and the player character can be reduced, so that the real player can obtain better game experience in the game match.

FIG. 3 is a detailed flowchart of the step 220 shown in FIG. 2, and as shown in FIG. 3, in some implementable implementations, the step 220 may include the following steps:

In step 221, according to the game alignments to which the intelligent agent and the player character in the game match belong, an adjustment amplitude of state information belonging to a preset type of the game state information is determined, where the preset type of the state information is state information that affects the game intention of the intelligent agent.

Here, the preset type of the state information refers to one or more types of state information that may affect the game intention of the intelligent agent in the game state information. For example, the game state information may include 10 types, where five types of game state information are related to the game intention of the intelligent agent, and then the preset types of the state information are the five types of game state information. In general, the health point, the mana point, the skill state, the economic state, the equipment and the like may be used as the game state information of the preset type.

The adjustment amplitude may include an adjustment direction and an adjustment size of the game state information. The adjustment direction refers to a data increase direction and a data decrease direction, and the adjustment size refers to a data increase numerical value and a data decrease numerical value. It should be understood that, the adjustment direction may be represented by positive and negative signs. For example, if the adjustment amplitude of the health point is "−10", it indicates that the health point is reduced by 10 points, and if the adjustment amplitude of the health point is "+10", it indicates that the health point is increased by 10 points.

In some embodiments, the preset type of the state information may be determined through the following manner of feature disturbance. For example, when the target game intention is obtained by inputting the target state information into the intention prediction model, the initial game state information may be input into the intention prediction model to obtain an initial game intention, then one type of state information in the initial game state information is modified, and the modified game state information is input into the intention prediction model to obtain a new game intention. By comparing whether the new game intention changes relative to the initial game intention, it may be determined whether the modified state information is the preset type of the state information. If the new game intention changes relative to the initial game intention, it may be determined that the modified state information is the preset type of the state information, and if the new game intention does not change relative to the initial game intention, it may be determined that the modified state information is not the preset type of the state information.

It is worth noting that, for the game state information of different types, the corresponding adjustment amplitudes may be different and may also be the same.

In step 222, according to the adjustment amplitude, the state information belonging to the preset type of the game state information is adjusted to obtain the target state information.

Here, after the adjustment amplitude is determined, the state information belonging to the preset type in the acquired game state information in the game match is adjusted according to the adjustment amplitude to obtain the target state information of the intelligent agent.

In this way, by adjusting the preset type of the state information, the game intention of the intelligent agent can be accurately modified, so that the game intention of the intelligent agent can be changed along with the game situation and/or the player intention of the player character, and the game action of the intelligent agent is thus adjusted.

In some implementable implementations, in the case that the intelligent agent belongs to the same game alignment as the player character, if the player intention generated by the player character is related to the intelligent agent, the adjustment amplitude of the preset type of the state information of the intelligent agent is determined to be a first adjustment amplitude, where the first adjustment amplitude is used for enabling the target game intention, which is obtained according to the target state information obtained through the first adjustment amplitude, to be consistent with the player intention.

Here, the intelligent agent belonging to the same game alignment as the player character refers to that the intelligent agent belongs to the same team as the player character, and the intelligent agent and the player character manipulated by the real player belong to teammates. In a game match, a modification strategy of the game state information corresponding to the intelligent agent which belongs to the same game alignment as the player character is to determine the player intention generated by the player character, and in the case that the player intention is related to the intelligent agent, determine, to be first adjustment amplitude, the adjustment amplitude of the preset type of the state information in the game state information corresponding to the intelligent agent. The first adjustment amplitude enables the target game intention, which is obtained according to the target state information obtained through the first adjustment amplitude, to be consistent with the player intention. That is, after the game state information is adjusted through the first adjustment amplitude, the target state information of the intelligent agent is obtained, the target state information is input into the intention prediction model, and the target game intention, which is output by the intention prediction model and corresponds to the intelligent agent, is consistent with the player intention.

It is worth noting that, the player intention refers to the battle target of the player character in the game match, and the target game intention being consistent with the player intention refers to that the battle target of the player character is consistent with that of the intelligent agent. For example, the battle target of the player character is "to attack a target resource point", and then the battle target of the intelligent agent is also "to attack the target resource point".

It should be understood that, the player intention being related to the intelligent agent refers to that the battle target to be realized by the player character requires the cooperation of the intelligent agent. For example, when the player intention is "to dive under the tower to gank", "to assist the player character in cleaning the minions", "to cooperate to attack the wild monster", "to cooperate the attack and defend the tower" and the like, it indicates that the player intention is related to the intelligent agent.

Of course, the player intention being related to the intelligent agent may also refer to that the intelligent agent may cooperate with the player character to realize the player intention thereof in the current game state. The intelligent agent may cooperate with the player character to realize the player intention thereof in the current game state refers to that when the player character executes the player intention thereof at a preset position, the intelligent agent may reach the preset position and cooperate with the player character to realize the player intention thereof.

Figure 4A:
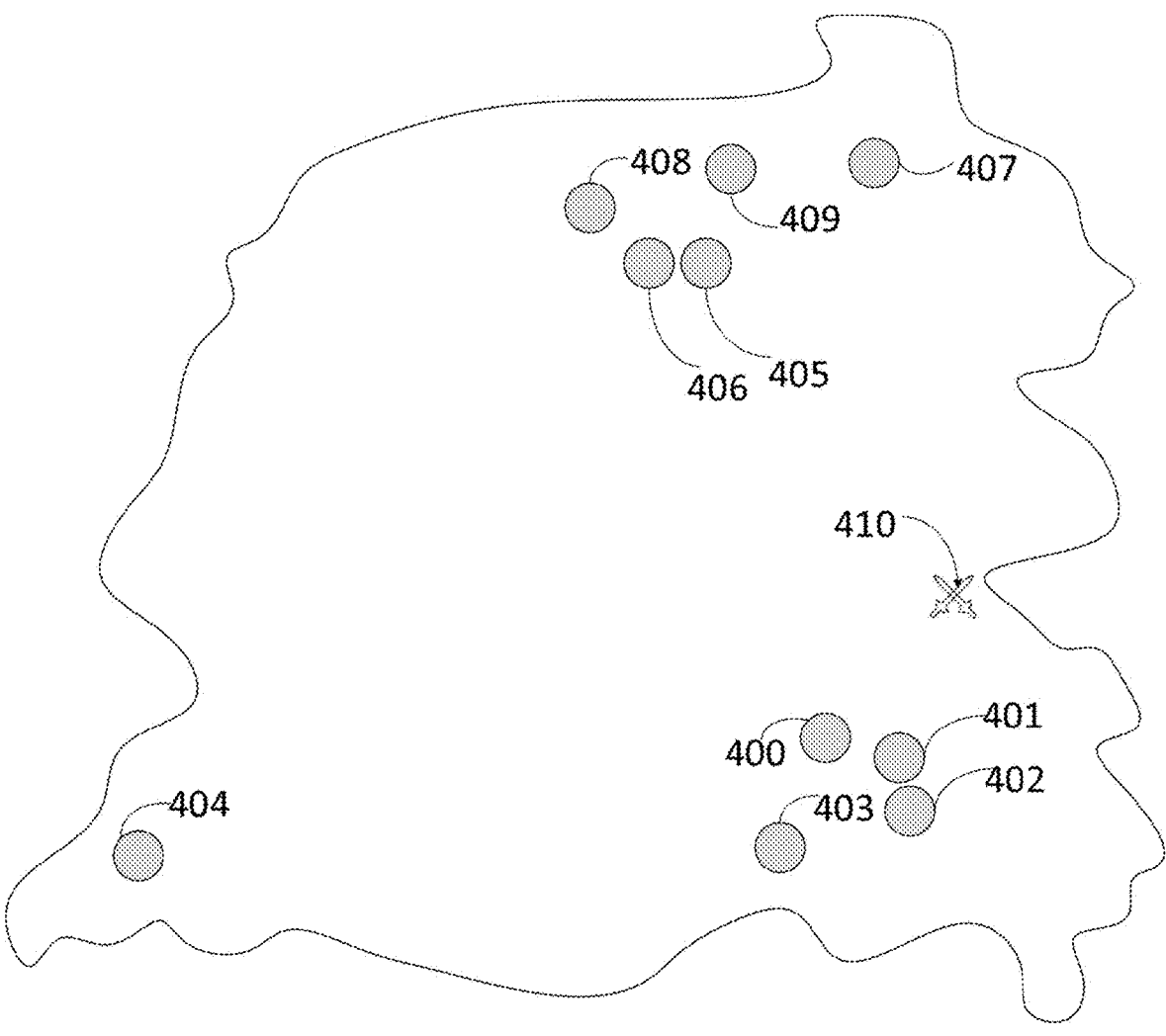
FIG. 4a is a schematic diagram illustrating a game match according to an exemplary embodiment.

FIG. 4a is a schematic diagram illustrating a game match according to an exemplary embodiment. As shown in FIG. 4a, game characters in the game match include a first intelligent agent 401, a second intelligent agent 402, a third intelligent agent 403, a fourth intelligent agent 404, a player character 400, a fifth intelligent agent 405, a sixth intelligent agent 406, a seventh intelligent agent 407, an eighth intelligent agent 408 and a ninth intelligent agent 409, where the first intelligent agent 401, the second intelligent agent 402, the third intelligent agent 403, the fourth intelligent agent 404 and the player character 400 belong to a first game alignment, the fifth intelligent agent 405, the sixth intelligent agent 406, the seventh intelligent agent 407, the eighth intelligent agent 408 and the ninth intelligent agent 409 belong to a second game alignment, and the first game alignment and the second game alignment are enemy alignments to each other.

In the game match shown in FIG. 4a, it is assumed that the player intention generated by the player character 400 at the current position thereof is "to attack a resource point 410", and since the resource point 410 is an epic-level resource point, other game characters are required to cooperate with the player character 400 to attack the resource point 410. At this time, it may be determined that the player intention generated by the player character 400 is related to the intelligent agents, that is, the player intention generated by the player character 400 is related to the first intelligent agent 401, the second intelligent agent 402, the third intelligent agent 403 and the fourth intelligent agent 404.

Of course, in some other embodiments, according to the distances between the player character 400 and other game characters (including the first intelligent agent 401, the second intelligent agent 402, the third intelligent agent 403 and the fourth intelligent agent 404) which belong to the first game alignment in the game match, the first intelligent agent 401, the second intelligent agent 402 and the third intelligent agent 403 may arrive at the resource point 410 when the player character 400 attacks the resource point 410 and cooperate with the player character 400 to realize the player intention thereof, and the fourth intelligent agent 404 cannot arrive at the resource point 410 when the player character 400 attacks the resource point 410, that is, the fourth intelligent agent 404 cannot assist the player character 400. Therefore, the player intention of the player character 400 is not related to the fourth intelligent agent 404, and the player intention of the player character 400 is related to the first intelligent agent 401, the second intelligent agent 402 and the third intelligent agent 403.

Figure 4B:
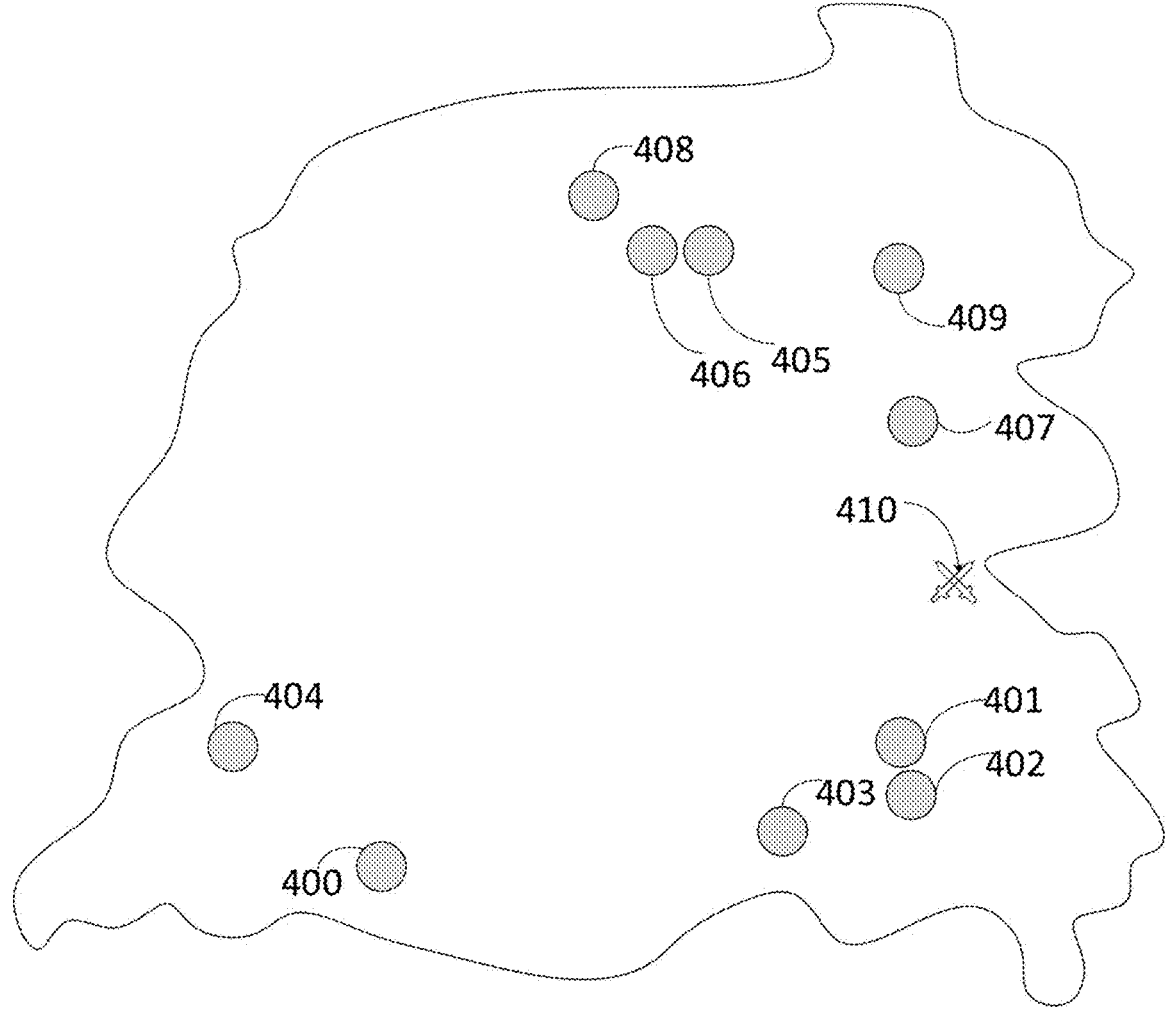
FIG. 4b is a schematic diagram illustrating a game match according to an exemplary embodiment.

FIG. 4b is a schematic diagram illustrating a game match according to an exemplary embodiment. As shown in FIG. 4b, it is assumed that the player intention generated by the player character 400 at the current position thereof is "to attack the resource point 410", and since the resource point 410 is the epic-level resource point, other game characters are required to cooperate with the player character 400 to attack the resource point 410. At this time, it may be determined that the player intention generated by the player character 400 is related to the intelligent agents, that is, the player intention generated by the player character 400 is related to the first intelligent agent 401, the second intelligent agent 402, the third intelligent agent 403 and the fourth intelligent agent 404.

In some other embodiments, according to the distances between the player character 400 and other game characters (including the first intelligent agent 401, the second intelligent agent 402, the third intelligent agent 403 and the fourth intelligent agent 404) which belong to the first game alignment in the game match, the first intelligent agent 401, the second intelligent agent 402, the third intelligent agent 403 and the fourth intelligent agent 404 may arrive at the resource point 410 when the player character 400 attacks the resource point 410 and cooperate with the player character 400 to realize the player intention thereof. Therefore, the player intention of the player character 400 is related to the first intelligent agent 401, the second intelligent agent 402, the third intelligent agent 403 and the fourth intelligent agent 404.

Therefore, on the basis of the above embodiments, in a game match, in the case that the intelligent agent belongs to the same game alignment as the player character, the preset type of the state information of the intelligent agent may be modified through the first adjustment amplitude, so that the target game intention of the intelligent agent can be consistent with the player intention, and accordingly, the intelligent agent cooperates with the real player in the game match, so as to provide the real player with an accompanying service with good experience.

In some implementable implementations, in the case that the intelligent agent belongs to a different game alignment from the player character, the adjustment amplitude of the preset type of the state information of the intelligent agent is determined to be a second adjustment amplitude according to a preset confrontation level, where the second adjustment amplitude is used for enabling a confrontation level corresponding to the target game intention, which is obtained according to the target state information obtained through the second adjustment amplitude, to be consistent with the preset confrontation level.

Here, the preset confrontation level refers to game difficulty set for the game match, for example, simple, common, difficult, nightmare, and the like. The preset confrontation level may be selected by a player before the game match is started, the preset confrontation level determines the competitive level of the intelligent agent in the game, that is, the higher the confrontation level is, the higher the competitive level of the intelligent agent is. The competitive level refers to an index capable of reflecting the game capability, for example, the accuracy of the intelligent agent for releasing a game skill during a game process, a skill release opportunity, the degree of fineness of moving, and the like.

The intelligent agent belonging to a different game alignment from the player character refers to that the intelligent agent and the player character do not belong to the same team, and the intelligent agent belongs to an opponent of the player character manipulated by the real player. In a game match, a modification strategy of the game state information corresponding to the intelligent agent which belongs to a different game alignment from the player character is to determine, according to the preset confrontation level, the adjustment amplitude of the preset type of the state information of the intelligent agent to be the second adjustment amplitude. The second adjustment amplitude enables the confrontation level corresponding to the target game intention, which is obtained according to the target state information obtained through the second adjustment amplitude, to be consistent with the preset confrontation level.

When the preset confrontation level set by the real player is "difficult", then the real player wishes to obtain higher game confrontation strength relative to a "common" confrontation level. At this time, the game state information of the preset type of the intelligent agent is modified through the second adjustment amplitude, and the confrontation strength between the intelligent agent and the player character may be adjusted by modifying the target game intention of the intelligent agent.

As shown in FIG. 4b, the player intention of the player character 400 is to attack the resource point 410, and if the preset confrontation level set in the present game match is "simple", it is necessary to reduce the confrontation strength between the intelligent agents (including the fifth intelligent agent 405, the sixth intelligent agent 406, the seventh intelligent agent 407, the eighth intelligent agent 408 and the ninth intelligent agent 409) of the second game alignment and the player character, so as to provide better game experience for the real player. At this time, the game state information of the preset type of the fifth intelligent agent 405, the sixth intelligent agent 406, the seventh intelligent agent 407, the eighth intelligent agent 408 and the ninth intelligent agent 409 may be modified through the second adjustment amplitude, so that the target game intention obtained according to the target state information is not to attack the resource point 410, and thus the player character 400 can successfully attack the resource point 410. That is, even if the seventh intelligent agent 407 is very close to the resource point 410, and the character state of the seventh intelligent agent 407 is good, the target game intention of the seventh intelligent agent 407 is not to attack the resource point 410 by modifying the game state information of the seventh intelligent agent 407.

When the player intention of the player character 400 is to attack the resource point 410, if the preset confrontation level set in the present game match is "difficult", it is necessary to improve the confrontation strength between the intelligent agents (including the fifth intelligent agent 405, the sixth intelligent agent 406, the seventh intelligent agent 407, the eighth intelligent agent 408 and the ninth intelligent agent 409) of the second game alignment and the player character, so as to provide the real player with game experience with a higher competitive level. At this time, the game state information of the preset type of the intelligent agents of the second game alignment may be modified through the second adjustment amplitude, so that the target game intention obtained according to the target state information is also to attack the resource point 410, and thus the player character 400 can combat with the intelligent agents of the second game alignment at the resource point 410. Therefore, the confrontation strength of the real player is improved.

It is worth noting that, under different confrontation levels, the value of the second adjustment amplitude may be different, the second adjustment amplitude may be set according to actual situations, but the purpose of the second adjustment amplitude is to make the confrontation level corresponding to the target game intention, which is obtained according to the target state information obtained through the second adjustment amplitude, be consistent with the preset confrontation level.

Therefore, on the basis of the above embodiments, in a game match, in the case that the intelligent agent belongs to a different game alignment from the player character, the preset type of the state information of the intelligent agent may be modified through the second adjustment amplitude, so that a confrontation level generated by the target game intention of the intelligent agent is consistent with the preset confrontation level. Therefore, confrontation strength conforming to the requirements of the real player is performed with the real player in the game match, so as to provide the real player with an accompanying service with good experience.

In some implementable implementations, the target state information may be used as the input of the intention prediction model, so as to obtain a first game intention output by the intention prediction model, and the target game intention corresponding to the intelligent agent is determined according to the first game intention.

Here, the intention prediction model is obtained by training a machine learning model with a first training samples, and the first training samples includes historical game state information labeled with a historical game intention. The historical game state information may be extracted from a historical game match, and the historical game intention corresponding to the historical game state information is labeled through a model or in manual manner, so as to obtain the first training samples.

It should be understood that, how to train the machine learning model by means of the first training samples may refer to the existing model training method, and thus details are not described herein again.

It is worth noting that, the target game intention may be equal to the first game intention. For example, the first game obtained according to the target state information is "to attack a defense tower on a central path", and then the target game intention of the intelligent agent may also be "to attack the defense tower on the central path".

Of course, in some embodiments, the target game intention may also be a new game intention generated according to the first game intention, and the new game intention is consistent with the battle target corresponding to the first game intention. For example, the first game intention obtained according to the target state information is "to attack a resource point", the essence of the battle target realized by the first game intention is "to push tower", and according to a mapping relationship between the battle target and the game intention, the battle target corresponding to the game intention of "to dive under the tower to gank" may also be "to push tower", and then the target game intention of "to dive under the tower to gank" may be generated according to the first game intention.

For example, when the intelligent agent belongs to a game character of a wandering position, if the first game intention obtained by the intelligent agent according to the target state information is "to attack the target resource point", and then the target game intention of "to dive under the tower to gank" may be derived according to the battle target of "to push tower" corresponding to "to attack the target resource point". It should be understood that, the target game intention of "to dive under the tower to gank" may be inconsistent with the target operation corresponding to "to attack the target resource point". For example, "to attack the target resource point" may be that the intelligent agent belonging to the wandering position directly cooperates with other game characters to attack the target resource point, while the target operation corresponding to "to dive under the tower to gank" may be that the intelligent agent belonging to the wandering position crouches an enemy hero, so as to force the enemy hero to abandon defending the target resource point, thereby indirectly realizing the battle target of attacking the target resource point.

In this way, by means of the intention prediction model, the target game intention of the intelligent agent corresponding to the target state information can be accurately obtained, so as to accurately determine the target operation of the intelligent agent, so that the intelligent agent can execute the target operation corresponding to the target game intention.

FIG. 5 is a flowchart of determining the target game intention illustrated according to an exemplary embodiment. As shown in FIG. 5, the target game intention may be determined by means of the following steps:

In step 510, the target state information is used as the input of an intention prediction model, so as to obtain a first game intention output by the intention prediction model, where the intention prediction model is obtained by training a machine learning model with a first training samples, and the first training samples includes historical game state information labeled with a historical game intention.

Here, with regard to detailed description of step 510, reference may be made to the above embodiments, and thus details are not described herein again.

In step 520, it is determined whether the player character in the game match has a second game intention.

Here, the second game intention is equivalent to the player intention in the above embodiments, which refers to a battle target generated by the player character in the game match. In the game match, if it is detected that the player character generates the battle target, it is determined that the player character has the second game intention.

In some embodiments, the second game intention of the player character may be determined according to a game signal triggered by the player character in the game match and/or position information of the player character in a game map.

Here, the game signal refers to a signal which is triggered by the player character and is used for representing the battle target, and the game signal may be a signal of such types as a game mark signal, a text message, a voice message, and the like. The game mark signal includes "attack", "withdraw", "warn", "arrival", and the like. For example, the player character may mark a defense tower, a hero, a monster and the like by using an "attack" signal, so as to indicate that the second game intention is to attack the defense tower, the hero, the monster, and the like. As another example, when the player character sends a "withdrawal" signal, it indicates that the second game intention of the player character is withdrawal and defense.

The position information of the player character in the game map may refer to real-time position information of the player character in the game map, for example, as shown in FIG. 4a, when the player character 400 is located at the resource point 410 shown in FIG. 4a, it may be indicated that the second game intention of the player character 400 is "to attack the resource point 410". Of course, the position information of the player character in the game map may also refer to a movement trajectory of the player in the game map. That is, a trajectory formed by the positions of the player character in a plurality of frames of game pictures. For example, as shown in FIG. 4b, when the position information of the player character 400 in the game map represents that the player character 400 moves to the resource point 410, it is determined that the second game intention of the player character 400 is "to attack the resource point 410".

Therefore, by means of the game signal triggered by the player character in the game match and/or the position information of the player character in the game map, the second game intention of the player character can be accurately determined according to the behaviors of the player character in the game match.

In step 530, in the case that the player character has the second game intention, the target game intention is determined according to the second game intention and the first game intention.

Here, in the case that the player character has the second game intention, the target game intention of the intelligent agent is determined according to the second game intention and the first game intention. The second game intention and the first game intention may be compared to determine the target game intention.

As some examples, in the case that the player character has the second game intention and the second game intention is associated with the intelligent agent, the target game intention is obtained according to the second game intention.

The second game intention being associated with the intelligent agent refers to that the battle target to be realized by the player character requires the cooperation of the intelligent agent. Or, the second game intention being associated with the intelligent agent may also refer to that the intelligent agent may cooperate with the player character in the current game state to realize the battle target thereof. It should be understood that, the second game intention being associated with the intelligent agent generally refers to whether the second game intention of the player character is associated with the intelligent agent belonging to the same game alignment.

In the case that the player character has the second game intention and the second game intention is associated with the intelligent agent, it indicates that the second game intention generated by the player character requires the cooperation of the player character. At this time, the intelligent agent belonging to the same game alignment as the player character needs to cooperate with the player character, and then the target game intention of the intelligent agent may be determined according to the second game intention, so that the battle target realized by the target game intention can be consistent with the battle target realized by the second game intention.

It is worth noting that, the specific embodiment of determining the target game intention according to the second game intention may refer to the above embodiments in which the target game intention is determined according to the first game intention, and thus will not be described in detail herein.

As some other examples, in the case that the player character has the second game intention, the target game intention may be determined according to the priorities of the first game intention and the second game intention.

For example, in the case that the priority of the second game intention is greater than or equal to the priority of the first game intention, the target game intention may be determined according to the second game intention; and in the case that the priority of the second game intention is less than the priority of the first game intention, the target game intention may be determined according to the first game intention.

Exemplarily, the priorities between different game intentions may be preset. Of course, when the intelligent agent serves as the character of an accompanying robot, the second game intention may also be set to have the highest priority, that is, as long as the player character has the second game intention, the target game intention is determined according to the second game intention, so that the intelligent agent can preferentially consider the intention of the player character, so as to provide a high-quality accompanying service.

In step 540, in the case that the player character does not have the second game intention, the target game intention corresponding to the intelligent agent is determined according to the first game intention.

Here, the specific embodiment of determining the target game intention according to the first game intention may refer to the above embodiments, and thus will not be described in detail herein.

Therefore, by making reference to the second game intention generated by the player character, when determining the game intention of itself, the intelligent agent can consider the battle target of the player character, and the own battle target of the intelligent agent is formulated according to the battle target of the player character, so that the intelligent agent cooperates with the player character to execute the battle target, so as to provide an accompanying service with better game experience.

The above embodiments are described in detail below with reference to FIG. 6.

Figure 6:
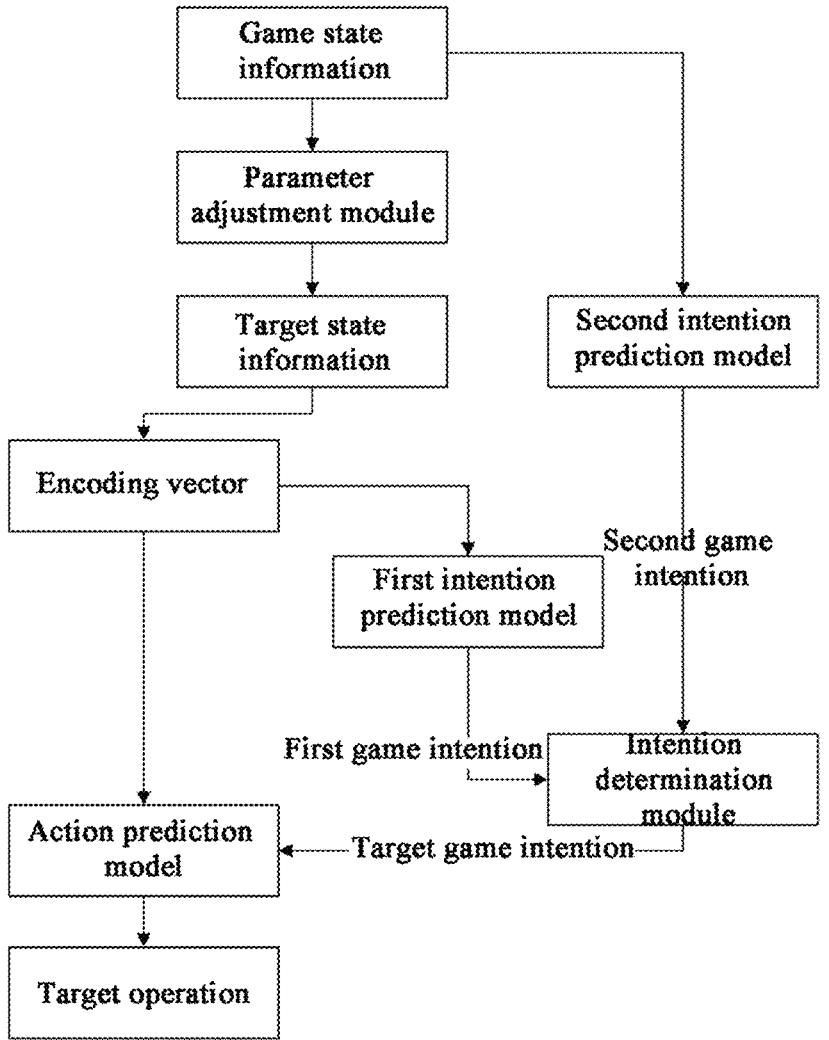
FIG. 6 is a schematic logical diagram illustrating a game character control method according to another exemplary embodiment.

FIG. 6 is a schematic logical diagram illustrating the game character control method according to another exemplary embodiment. As shown in FIG. 6, game state information may be acquired, and the game state information is adjusted by means of a parameter adjustment module, so as to obtain target state information corresponding to an intelligent agent. The parameter adjustment module is configured to adjust the game state information according to a game alignment to which the intelligent agent and a player character in a game match belong, so as to obtain target state information adapted to the intelligent agent.

Then, the target state information is encoded to obtain an encoding vector. The encoding vector is input into a first intention prediction model, so as to obtain a first game intention corresponding to the target state information. In addition, a game signal triggered by the player character and/or position information of the player character in a game map in the game state information is input into a second intention prediction model, so as to obtain a second game intention corresponding to the player character.

The target game intention is determined by an intention determination module according to the first game intention and the second game intention, and the target game intention and the encoding vector are input into an action prediction model, so as to obtain a target operation. The intention determination module is configured to determine the target game intention according to the second game intention and the first game intention in the case that the player character has the second game intention, and determine the target game intention according to the first game intention in the case that the player character does not have the second game intention.

Figure 7:
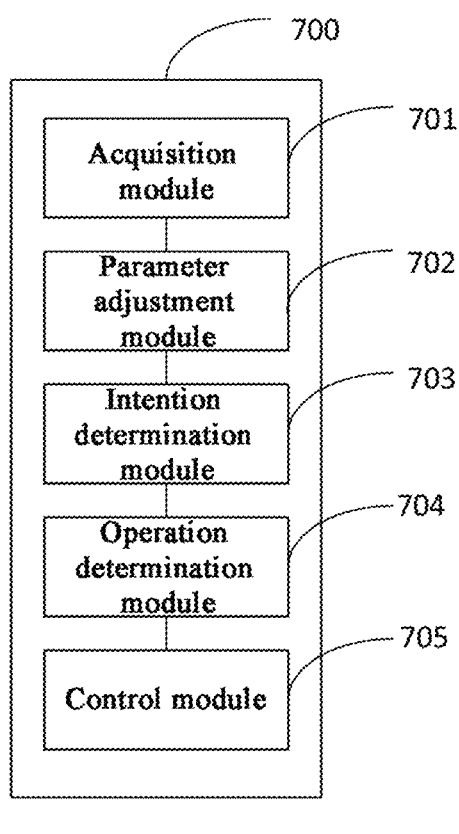
FIG. 7 is a schematic diagram illustrating a module connection of a game character control apparatus according to an exemplary embodiment.

FIG. 7 is a schematic diagram illustrating a module connection of a game character control apparatus according to an exemplary embodiment. As shown in FIG. 7, an embodiment of the present disclosure provides a game character control apparatus, and the apparatus 700 includes:

an acquisition module 701, configured to acquire game state information of a game match;

a parameter adjustment module 702 configured to, according to game alignments to which an intelligent agent and a player character in the game match belong, adjust the game state information to obtain target state information adapted to the intelligent agent;

an intention determination module 703 configured to, on the basis of the target state information, determine a target game intention corresponding to the intelligent agent, where the target game intention characterizes a battle target of the intelligent agent;

an operation determination module 704 configured to, according to the target game intention and the target state information, determine a target operation corresponding to the intelligent agent; and a control module 705, configured to control the intelligent agent to execute the target operation.

Optionally, the parameter adjustment module 702 includes:

a first adjustment unit configured to, according to the game alignments to which the intelligent agent and the player character in the game match belong, determine an adjustment amplitude of state information belonging to a preset type of the game state information, where the preset type of the state information is state information that affects the game intention of the intelligent agent; and a second adjustment unit configured to, according to the adjustment amplitude, adjust the state information belonging to the preset type of the game state information to obtain the target state information.

Optionally, the first adjustment unit is specifically configured to:

in the case that the intelligent agent belongs to the same game alignment as the player character, if a player intention generated by the player character is related to the intelligent agent, determine the adjustment amplitude of the preset type of the state information of the intelligent agent to be a first adjustment amplitude, where the first adjustment amplitude is used for enabling the target game intention, which is obtained according to the target state information obtained through the first adjustment amplitude, to be consistent with the player intention; and in the case that the intelligent agent belongs to a different game alignment from the player character, determine the adjustment amplitude of the preset type of the state information of the intelligent agent to be a second adjustment amplitude according to a preset confrontation level, where the second adjustment amplitude is used for enabling a confrontation level corresponding to the target game intention, which is obtained according to the target state information obtained through the second adjustment amplitude, to be consistent with the present confrontation level.

Optionally, the intention determination module 703 includes:

a first determination unit, configured to use the target state information as the input of an intention prediction model, so as to obtain a first game intention output by the intention prediction model, where the intention prediction model is obtained by training a machine learning model with a first training samples, and the first training samples includes historical game state information labeled with a historical game intention; and a second determination unit, configured to determine, according to the first game intention, the target game intention corresponding to the intelligent agent.

Optionally, the apparatus 700 further includes:

a player determination module, configured to determine whether the player character in the game match has a second game intention, where the second game intention characterizes a battle target of the player character; and the second determination unit is specifically configured to:

in the case that the player character has the second game intention, determine the target game intention according to the second game intention and the first game intention.

Optionally, the player determination module is specifically configured to:

determine the second game intention of the player character according to a game signal triggered by the player character in the game match and/or position information of the player character in a game map.

Optionally, the game state information includes at least one of the following:

character state data of the game character of the game match, a game environment where the game character is located, and communication information of the game character.

With regard to the apparatus 700 in the above embodiment, the specific manner in which each module executes operations has been described in detail in the embodiments related to the method, and thus will not be described in detail herein.

Figure 8:
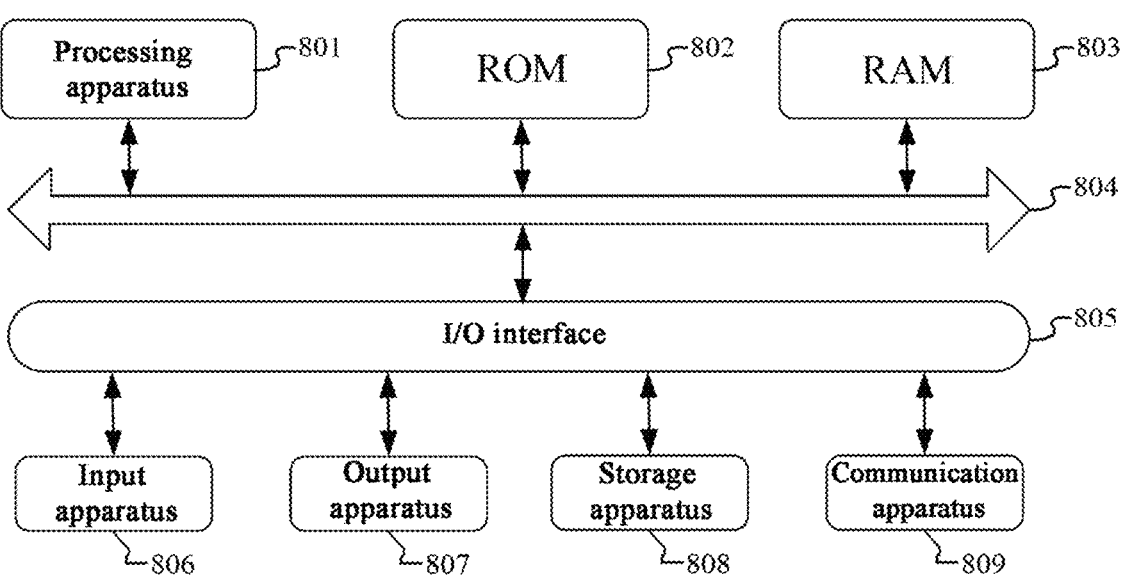
FIG. 8 is a schematic structural diagram illustrating an electronic device according to an exemplary embodiment.

Referring to FIG. 8, FIG. 8 illustrates a schematic structural diagram of an electronic device (for example, the terminal or the server in FIG. 1) 800 suitable for implementing the embodiments of the present disclosure. The terminal device in the embodiments of the present disclosure may include, but is not limited to, mobile terminals such as a mobile phone, a notebook computer, a digital broadcast receiver, a PDA (personal digital assistant), a PAD (tablet computer), a PMP (portable multimedia player), a vehicle-mounted terminal (e.g., a vehicle-mounted navigation terminal), and the like, and fixed terminals such as a digital TV and a desktop computer. The electronic device shown in FIG. 8 is merely an example, and should not bring any limitation to the functions and use ranges of the embodiments of the present disclosure.

As shown in FIG. 8, the electronic device 800 may include a processing apparatus (e.g., a central processing unit, a graphics processing unit or the like) 801, which may execute various appropriate actions and processing according to programs stored in a read-only memory (ROM) 802 or programs loaded from a storage apparatus 808 into a random access memory (RAM) 803. In the RAM 803, various programs and data necessary for the operations of the electronic device 800 may also be stored. The processing apparatus 801, the ROM 802 and the RAM 803 are connected with each other by means of a bus 804. An input/output (I/O) interface 805 is also connected to the bus 804.

Generally, the following apparatuses may be connected to the I/O interface 805: an input apparatus 806, including, for example, a touch screen, a touchpad, a keyboard, a mouse, a camera, a microphone, an accelerometer, a gyroscope, and the like; an output apparatus 807, including, for example, a liquid crystal display (LCD), a speaker, a vibrator, and the like; the storage apparatus 808, including, for example, a magnetic tape, a hard disk, and the like; and a communication apparatus 809. The communication apparatus 809 may allow the electronic device 800 to perform wireless or wired communication with other devices, so as to exchange data. Although FIG. 8 illustrates the electronic device 800 having various apparatuses, it should be understood that, it is not required to implement or have all illustrated apparatuses. More or fewer apparatuses may be alternatively implemented or provided.

In particular, according to the embodiments of the present disclosure, the process described above with reference to the flowchart may be implemented as a computer software program. For example, the embodiments of the present disclosure include a computer program product, which includes a computer program carried on a non-transitory computer-readable medium, and the computer program contains program codes for executing the method shown in the flowchart. In such embodiments, the computer program may be downloaded and installed from a network by means of the communication apparatus 809, or installed from the storage apparatus 808, or installed from the ROM 802. When executed by the processing apparatus 801, the computer program executes the above functions defined in the method in the embodiments of the present disclosure.

It should be noted that, the above computer-readable medium in the present disclosure may be a computer-readable signal medium or a computer-readable storage medium, or any combination of thereof. The computer-readable storage medium may be, for example, but is not limited to, electrical, magnetic, optical, electromagnetic, infrared, or semiconductor systems, apparatuses or devices, or any combination thereof. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or a flash memory), an optical fiber, a portable compact disk-read-only memory (CD-ROM), an optical storage device, a magnetic storage device, or any suitable combination thereof. In the present disclosure, the computer-readable storage medium may be any tangible medium that contains or stores programs, and the programs may be used by or combined with instruction execution systems, apparatuses or devices for use. In the present disclosure, the computer-readable signal medium may include a data signal which is propagated in a baseband or as part of a carrier, in which computer-readable program codes are carried. Such a propagated data signal may take a variety of forms, including, but not limited to, electromagnetic signals, optical signals, or any suitable combination thereof. The computer-readable signal medium may also be any computer-readable medium other than the computer-readable storage medium, and the computer-readable signal medium may send, propagate, or transmit programs for use by or in combination with the instruction execution systems, apparatuses or devices. The program codes contained on the computer-readable medium may be transmitted by using any suitable medium, including, but not limited to: an electric wire, an optical cable, RF (radio frequency), and the like, or any suitable combination of thereof.

In some implementations, the terminal and the server may communicate by using any currently known or future developed network protocol, such as an HTTP (HyperText Transfer Protocol, hypertext transfer protocol), and may be interconnected with a digital data communication (e.g., a communication network) of any form or medium. Examples of the communication network include a local area network ("LAN"), a wide area network ("WAN"), Internet network (e.g., the Internet), an end-to-end network (e.g., an ad hoc end-to-end network), as well as any currently known or future developed network.

The computer-readable medium may be contained in the electronic device; and may also exist alone, but is not assembled in the electronic device.

The computer-readable medium carries one or more programs, and when the one or more programs are executed by the electronic device, the electronic device executes the following operations: acquiring game state information of a game match; according to game alignments to which an intelligent agent and a player character in the game match belong, adjusting the game state information to obtain target state information adapted to the intelligent agent; on the basis of the target state information, determining a target game intention corresponding to the intelligent agent, where the target game intention characterizes a battle target of the intelligent agent; according to the target game intention and the target state information, determining a target operation corresponding to the intelligent agent; and controlling the intelligent agent to execute the target operation.

Computer program codes for executing the operations of the present application may be written in one or more programming languages or combinations thereof, the programming languages include, but are not limited to, object-oriented programming languages, such as Java, Smalltalk and C++, and also include conventional procedural programming languages, such as "C" language or similar programming languages. The program codes may be completely executed on a user computer, partly on the user computer, as a stand-alone software package, partly on the user computer and partly on a remote computer, or completely on the remote computer or a server. In the case involving the remote computer, the remote computer may be connected to the user computer by means of any kind of network, including a local area network (LAN) or a wide area network (WAN), or may be connected to an external computer (e.g., connected by means of the Internet by using an internet service provider).

The flowcharts and block diagrams in the drawings illustrate system architectures, functions and operations that may be implemented by the systems, methods and computer program products according to various embodiments of the present disclosure. In this regard, each block in the flowcharts or block diagrams may represent a part of a module, a program segment or a code, and a part of the module, the program segment or the code contains one or more executable instructions for implementing specified logical functions. It should also be noted that, in some alternative implementations, functions annotated in the blocks may also occur in a different order from those annotated in the drawings. For example, two consecutive blocks may, in fact, be executed substantially in parallel, and may also be executed in a reverse order sometimes, depending upon the functions involved. It should also be noted that, each block in the block diagrams and/or flowcharts, and combinations of the blocks in the block diagrams and/or flowcharts may be implemented by dedicated hardware-based systems, which are used for executing the specified functions or operations, or may be implemented by a combination of dedicated hardware and computer instructions.

The modules involved in the description of the embodiments of the present disclosure may be implemented in a software manner, and may also be implemented in a hardware manner. In some cases, the name of the module does not constitute a limitation on the module itself.

The above functions described herein may be executed, at least in part, by one or more hardware logic components. For example, non-restrictively, available hardware logic components of an exemplary type include: a field-programmable gate array (FPGA), an application-specific integrated circuit (ASIC), an application-specific standard product (ASSP), an on-chip system (SOC), a complex programmable logic device (CPLD), and the like.

In the context of the present disclosure, a machine-readable medium may be a tangible medium, which may contain or store programs for use by or in combination with instruction execution systems, apparatuses or devices. The machine-readable medium may be a machine-readable signal medium or a machine-readable storage medium. The machine-readable medium may include, but is not limited to, electronic, magnetic, optical, electromagnetic, infrared, or semiconductor systems, apparatuses or devices, or any suitable combination of thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk-read-only memory (CD-ROM), an optical storage device, a magnetic storage device, or any suitable combination of thereof.

The above description is merely illustration of preferred embodiments of the present disclosure and the applied technical principles. It should be understood by those skilled in the art that, the scope of disclosure involved in the present disclosure is not limited to technical solutions formed by particular combinations of the above technical features, and should also cover other technical solutions formed by any combination of the above technical features or equivalent features thereof without departing from the above disclosed concepts, for example, technical solutions formed by replacing the above features with technical features having similar functions disclosed in the present disclosure (but not limited to).

In addition, although various operations are depicted in a particular order, it should not be understood that these operations are required to be executed in the shown particular order or in sequential order. In certain environments, multitasking and parallel processing may be advantageous. Likewise, although several specific implementation details are contained in the above discussion, these should not be construed as limiting the scope of the present disclosure. Some features described in the context of separate embodiments may also be implemented in combination in a single embodiment. Conversely, various features described in the context of a single embodiment may also be implemented in a plurality of embodiments separately or in the form of any suitable sub-combination.

Although the present theme has been described in a language specific to structural features and/or method logical actions, it should be understood that the theme defined in the appended claims is not necessarily limited to the particular features or actions described above. Rather, the particular features or actions described above are merely exemplary forms of implementing the claims. With regard to the apparatus in the above embodiments, the specific manner in which each module executes operations has been described in detail in the embodiments related to the method, and thus will not be described in detail herein.

We claim:

1. A game character control method, comprising:
  acquiring game state information of a game match;
  adjusting a preset type of the game state information to obtain target state information adapted to an intelligent agent, according to game alignments to which the intelligent agent and a player character in a game battle belong,
  wherein the preset type of the game state information is state information that affects a game intention of the intelligent agent, and state information is determined whether it belongs to the preset type of the game state information based on a game intention difference between an initial game state information and an updated game state information to be input into an intention prediction model;

determining a target game intention corresponding to the intelligent agent by inputting the target state information into the intention prediction model wherein the target game intention characterizes a battle target of the intelligent agent;

determining a target operation corresponding to the intelligent agent by inputting the target game intention and the target state information into an action prediction model; and controlling the intelligent agent to execute the target operation.

2. The method according to claim 1, wherein the adjusting the game state information to obtain the target state information adapted to the intelligent agent according to the game alignments to which the intelligent agent and the player character in the game battle belong, comprises:

determining an adjustment amplitude of state information belonging to the preset type of the game state information according to the game alignments to which the intelligent agent and the player character in the game battle belong; and adjusting, according to the adjustment amplitude, the state information belonging to the preset type of the game state information to obtain the target state information.

3. The method according to claim 2, wherein the determining the adjustment amplitude of the state information belonging to the preset type of the game state information according to the game alignments to which the intelligent agent and the player character in the game battle belong, comprises:

in the case that the intelligent agent belongs to the same game alignment as the player character, in response to a player intention generated by the player character being related to the intelligent agent, determining the adjustment amplitude of the preset type of the state information of the intelligent agent to be a first adjustment amplitude, wherein the first adjustment amplitude is used for enabling the target game intention, which is obtained according to the target state information obtained through the first adjustment amplitude, to be consistent with the player intention; and in the case that the intelligent agent belongs to a different game alignment from the player character, determining the adjustment amplitude of the preset type of the state information of the intelligent agent to be a second adjustment amplitude according to a preset confrontation level, wherein the second adjustment amplitude is used for enabling a confrontation level corresponding to the target game intention, which is obtained according to the target state information obtained through the second adjustment amplitude, to be consistent with the present confrontation level.

4. The method according to claim 1, wherein the determining, based on the target state information, the target game intention corresponding to the intelligent agent, comprises:

using the target state information as input of the intention prediction model to obtain a first game intention output by the intention prediction model, wherein the intention prediction model is obtained by training a machine learning model with a first training sample, and the first training sample comprises historical game state information labeled with a historical game intention; and determining, according to the first game intention, the target game intention corresponding to the intelligent agent.

5. The method according to claim 4, wherein the method further comprises:

determining whether the player character in the game match has a second game intention, wherein the second game intention characterizes a battle target of the player character; and wherein the determining, according to the first game intention, the target game intention corresponding to the intelligent agent, comprises:

in the case that the player character has the second game intention, determining the target game intention according to the second game intention and the first game intention.

6. The method according to claim 5, wherein the second game intention is obtained by following step:

determining the second game intention of the player character according to a game signal triggered by the player character in the game match and/or position information of the player character in a game map.

7. The method according to claim 1, wherein the game state information comprises at least one of following:

character state data of the game character of the game match, a game environment where the game character is located, and communication information of the game character.

8. An electronic device, comprising:

a storage apparatus, on which a computer program is stored; and a processing apparatus, used for executing the computer program in the storage apparatus to implement following steps:

acquiring game state information of a game battle;

adjusting a preset type of the game state information to obtain target state information adapted to an intelligent agent, according to game alignments to which an intelligent agent and a player character in the game battle belong, wherein the preset type of the game state information is state information that affects a game intention of the intelligent agent, and state information is determined whether it belongs to the preset type of the game state information based on a game intention difference between an initial game state information and an updated game state information to be input into an intention prediction model;

determining a target game intention corresponding to the intelligent agent by inputting the target state information into the intention prediction model, wherein the target game intention characterizes a battle target of the intelligent agent;

determining a target operation corresponding to the intelligent agent by inputting the target game intention and the target state information into an action prediction model; and controlling the intelligent agent to execute the target operation.

9. The electronic device according to claim 8, wherein the adjusting the game state information to obtain the target state information adapted to the intelligent agent according to the game alignments to which the intelligent agent and the player character in the game battle belong, comprises:

determining an adjustment amplitude of state information belonging to the preset type of the game state information according to the game alignments to which the intelligent agent and the player character in the game battle belong; and adjusting, according to the adjustment amplitude, the state information belonging to the preset type of the game state information to obtain the target state information.

10. The electronic device according to claim 9, wherein the determining the adjustment amplitude of the state information belonging to the preset type of the game state information according to the game alignments to which the intelligent agent and the player character in the game battle belong, comprises:

in the case that the intelligent agent belongs to the same game alignment as the player character, in response to a player intention generated by the player character being related to the intelligent agent, determining the adjustment amplitude of the preset type of the state information of the intelligent agent to be a first adjustment amplitude, wherein the first adjustment amplitude is used for enabling the target game intention, which is obtained according to the target state information obtained through the first adjustment amplitude, to be consistent with the player intention; and in the case that the intelligent agent belongs to a different game alignment from the player character, determining the adjustment amplitude of the preset type of the state information of the intelligent agent to be a second adjustment amplitude according to a preset confrontation level, wherein the second adjustment amplitude is used for enabling a confrontation level corresponding to the target game intention, which is obtained according to the target state information obtained through the second adjustment amplitude, to be consistent with the present confrontation level.

11. The electronic device according to claim 8, wherein the determining, based on the target state information, the target game intention corresponding to the intelligent agent, comprises:

using the target state information as input of the intention prediction model to obtain a first game intention output by the intention prediction model, wherein the intention prediction model is obtained by training a machine learning model with a first training sample, and the first training sample comprises historical game state information labeled with a historical game intention; and determining, according to the first game intention, the target game intention corresponding to the intelligent agent.

12. The electronic device according to claim 11, wherein the processing apparatus is used for executing the computer program in the storage apparatus to further implement following steps:

determining whether the player character in the game battle has a second game intention, wherein the second game intention characterizes a battle target of the player character; and wherein the determining, according to the first game intention, the target game intention corresponding to the intelligent agent, comprises:

in the case that the player character has the second game intention, determining the target game intention according to the second game intention and the first game intention.

13. The electronic device according to claim 12, wherein the second game intention is obtained by following step:

determining the second game intention of the player character according to a game signal triggered by the player character in the game battle and/or position information of the player character in a game map.

14. The electronic device according to claim 8, wherein the game state information comprises at least one of following:

character state data of the game character of the game battle, a game environment where the game character is located, and communication information of the game character.

15. A non-transitory computer-readable storage medium, on which a computer program is stored, wherein when executed by a processing apparatus, the program implements following steps:

acquiring game state information of a game battle;

adjusting a preset type of the game state information to obtain target state information adapted to an intelligent agent, according to game alignments to which the intelligent agent and a player character in the game battle belong, wherein the preset type of the game state information is state information that affects a game intention of the intelligent agent, and state information is determined whether it belongs to the preset type of the game state information based on a game intention difference between an initial game state information and an updated game state information to be input into an intention prediction model;

determining a target game intention corresponding to the intelligent agent by inputting the target state information into the intention prediction model, wherein the target game intention characterizes a battle target of the intelligent agent;

determining a target operation corresponding to the intelligent agent by inputting the target game intention and the target state information into an action prediction model; and controlling the intelligent agent to execute the target operation.

16. The non-transitory computer-readable storage medium according to claim 15, wherein the adjusting the game state information to obtain the target state information adapted to the intelligent agent according to the game alignments to which the intelligent agent and the player character in the game battle belong, comprises:

determining an adjustment amplitude of state information belonging to the preset type of the game state information according to the game alignments to which the intelligent agent and the player character in the game battle belong; and adjusting, according to the adjustment amplitude, the state information belonging to the preset type of the game state information to obtain the target state information.

17. The non-transitory computer-readable storage medium according to claim 16, wherein the determining the adjustment amplitude of the state information belonging to the preset type of the game state information according to the game alignments to which the intelligent agent and the player character in the game battle belong, comprises:

in the case that the intelligent agent belongs to the same game alignment as the player character, in response to a player intention generated by the player character being related to the intelligent agent, determining the adjustment amplitude of the preset type of the state information of the intelligent agent to be a first adjustment amplitude, wherein the first adjustment amplitude is used for enabling the target game intention, which is obtained according to the target state information obtained through the first adjustment amplitude, to be consistent with the player intention; and in the case that the intelligent agent belongs to a different game alignment from the player character, determining the adjustment amplitude of the preset type of the state information of the intelligent agent to be a second adjustment amplitude according to a preset confrontation level, wherein the second adjustment amplitude is used for enabling a confrontation level corresponding to the target game intention, which is obtained according to the target state information obtained through the second adjustment amplitude, to be consistent with the present confrontation level.

18. The non-transitory computer-readable storage medium according to claim 15, wherein the determining, based on the target state information, the target game intention corresponding to the intelligent agent, comprises:

using the target state information as input of the intention prediction model to obtain a first game intention output by the intention prediction model, wherein the intention prediction model is obtained by training a machine learning model with a first training sample, and the first training sample comprises historical game state information labeled with a historical game intention; and determining, according to the first game intention, the target game intention corresponding to the intelligent agent.

19. The non-transitory computer-readable storage medium according to claim 18, wherein when executed by a processing apparatus, the program further implements following steps:

determining whether the player character in the game battle has a second game intention, wherein the second game intention characterizes a battle target of the player character; and wherein the determining, according to the first game intention, the target game intention corresponding to the intelligent agent, comprises:

in the case that the player character has the second game intention, determining the target game intention according to the second game intention and the first game intention.

20. The non-transitory computer-readable storage medium according to claim 19, wherein the second game intention is obtained by following step:

determining the second game intention of the player character according to a game signal triggered by the player character in the game battle and/or position information of the player character in a game map.

* * * * *